United States Patent [19]

Weber

[11] 4,197,692
[45] Apr. 15, 1980

[54] MOWER COMPRISING CUTTER DISCS DRIVEN FROM BENEATH

[75] Inventor: Marcel Weber, Marmoutier, France

[73] Assignee: Samibem, S.A., Marmoutier, France

[21] Appl. No.: 907,327

[22] Filed: May 18, 1978

[30] Foreign Application Priority Data

May 27, 1977 [FR] France ................. 77 17303

[51] Int. Cl.² .......................................... A01D 55/26
[52] U.S. Cl. ........................................ 56/13.6; 56/295
[58] Field of Search ............... 56/6, 12.3, 295, 13.5, 56/13.6

[56] References Cited

U.S. PATENT DOCUMENTS

| | | | |
|---|---|---|---|
| 3,462,926 | 8/1969 | Webster et al. | 56/13.6 |
| 3,507,102 | 4/1970 | Kline et al. | 56/12.3 |
| 3,708,966 | 1/1973 | Reber | 56/6 |

FOREIGN PATENT DOCUMENTS

| | | | |
|---|---|---|---|
| 969055 | 5/1950 | France | 56/295 |
| 2033517 | 12/1970 | France | 56/295 |

*Primary Examiner*—Russell R. Kinsey
*Attorney, Agent, or Firm*—Young & Thompson

[57] ABSTRACT

The disclosure is of a mower comprising cutter discs each driven from beneath by a transmission in a housing containing lubricant and made to be fitted onto a support plate by a displacement perpendicular to the plane of the plate and then secured by fixing elements which extend perpendicularly to said plane, the housings being interchangeable and lubricant-tight irrespective of the presence of the transmission means.

7 Claims, 5 Drawing Figures

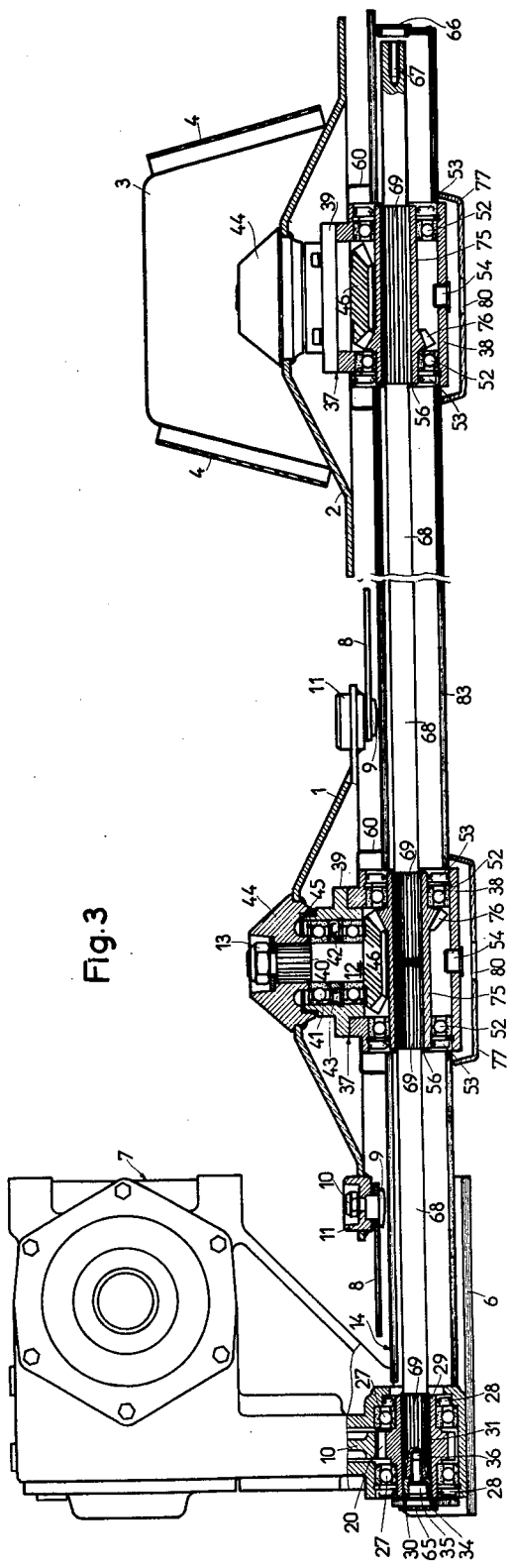
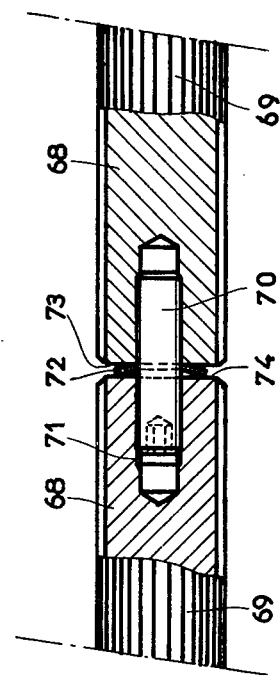

MOWER COMPRISING CUTTER DISCS DRIVEN FROM BENEATH

INTRODUCTION AND BACKGROUND OF THE INVENTION

The present invention relates to mowers comprising bottom-driven discs, more particularly those where the discs are driven by means of bevel couplings. In this type of mower the bevel couplings are housed either in a single housing extending beneath all the discs and containing a bath of lubricant, or in housings where the lubricant is in danger of escaping when the transmission shaft extending through each disc housing is withdrawn therefrom.

All these machines possess one or more of the following drawbacks:

Lengthy and delicate assembly and dismantlement both for the manufacturer and especially for the user, Necessity of adjustment of the bevel coupling each time the transmission member passing through the disc housing must be re-fitted after repair, Risk of oil losses, especially during repairs, Risk of penetration of dirt into the bevel couplings and their bearings, Risk of incorrect oil level; it is known that even a slight upward or downward variation of oil level involves grave consequences in view of the high rotation speed of the bevel couplings driving the discs, Risk of poor lubrication of the end bevel couplings when the cutter bar is working in an inclined position, for example along a slope, and risk of deterioration of a large number of transmission members in the case of an accident to any one of them.

The purpose of the present invention is to remedy all these drawbacks.

BRIEF SUMMARY OF THE INVENTION

The mower according to this invention is provided with at least one transmission member, such as a shaft made in one or more parts, extending at least partially through a disc housing. Each housing is designed to be capable of being fitted onto a support plate by a displacement perpendicular to the plane in which the said plate extends. The elements for fixing these housings in fact extend exclusively perpendicular to the said support plate, these housings being sealed, independently of the presence of a transmission member, that is to say it is possible to withdraw the said transmission member from each of the housings without the tightness of these housings being thereby affected.

FURTHER DESCRIPTION AND ADVANTAGES OF THE INVENTION

According to the invention it is possible to remove and refit any one of the housings without touching the other housings. Thus all the elements for fixing the housings are accessible from only one of the faces of the said plate.

According to another characteristic of the invention all the disc housings are identical and symmetrical in relation to the rotation axes of their corresponding discs. These housings with their corresponding discs can be utilised for the drive of the said discs in rotation equally either in one direction or in the other. Thus it is very easily possible to adapt the mower according to the invention, at lowest cost, to the various tasks to be performed, for example as a function of the number of discs, of the desired windrow and/or according to whether the mower is used alone or is integrated for example into a conditioner or a forage harvester.

The direction of rotation of the discs in fact is a function solely of the manner in which the said disc housings are mounted on the support plate which connects as many housings as the mower is to comprise discs.

This manner of fitting of the housings on their support plate to a certain extent permits of regarding each disc housing as independent of its adjacent housing or housings, at least as regards the fixing of the latter. This constitutes a very interesting advantage on the one hand for the user and on the other for the manufacturer.

For the user it is easy to fit and especially to replace any one of the housings, especially since there is no need to be concerned with its lubrication. In fact the means ensuring the sealing of each disc housing are constituted by a sleeve coaxially fast with a pinion and prolonging the latter. The assembly thus formed extends between the extremities of each disc housing where seal devices are situated which are provided respectively between one of the extremities of the housing and one of the extremities of the sleeve and between the other extremity of the housing and one of the extremities of the said pinion.

For the manufacture, in the machining of the support plate, the position of the parts can very well depend not upon a single reference surface but upon one another, without the fitting of the said housings in the support plate thereby being affected. This is not the case in mowers where the housings are further interconnected for example by means of struts. In this case in machining it is necessary to take account both of the tolerances of the position data and of the tolerances of the struts which, by adding to one another, are in danger of rendering the assembly of this type of mower very critical.

The machining of the support plate on which the disc housings are mounted according to the invention is thus very simple. Thus it can be effected for example by stamping.

Moreover as the present invention concerns mowers having bottom-driven discs, all the elements situated beneath these discs must have the least possible thickness so that the fodder can be cut very short without the resistance of the said elements being thereby affected.

This is the case in particular with the transmission members and the sleeves and pinions with which these members cooperate through the intermediary of splines. In order that these may be of the least possible height while permitting of transmitting a given torque, at least nine splines are provided on the transmission members.

By increasing the number of splines and providing them with low height it is possible to reduce the diameter of the sleeve provided in each disc housing through which the transmission member or members extend. The total thickness of the machine can thus be reduced, which reduces the cutting height. A large number of splines also permits of reducing the unit pressure of each male spline upon each female spline and of reducing the stress concentrations. Thus the slight thrusts to which the splines and sleeves are subjected permit of limiting the risks of bursting of the sleeves despite the provision of sleeves of reduced diameter.

BRIEF DESCRIPTION OF THE VIEWS IN THE DRAWINGS

The invention will be explained in greater detail hereinafter with further characteristics and advantages, in the following non-limitative description of a certain number of examples of embodiment of the invention given with reference to the accompanying drawings, wherein:

FIG. 3 represents a second embodiment of the device illustrated in FIG. 2;

FIG. 4 represents a design detail of FIG. 3 on a larger scale;

DETAILED DESCRIPTION OF THE PREFERRED EMBODIMENTS

Figure 1:
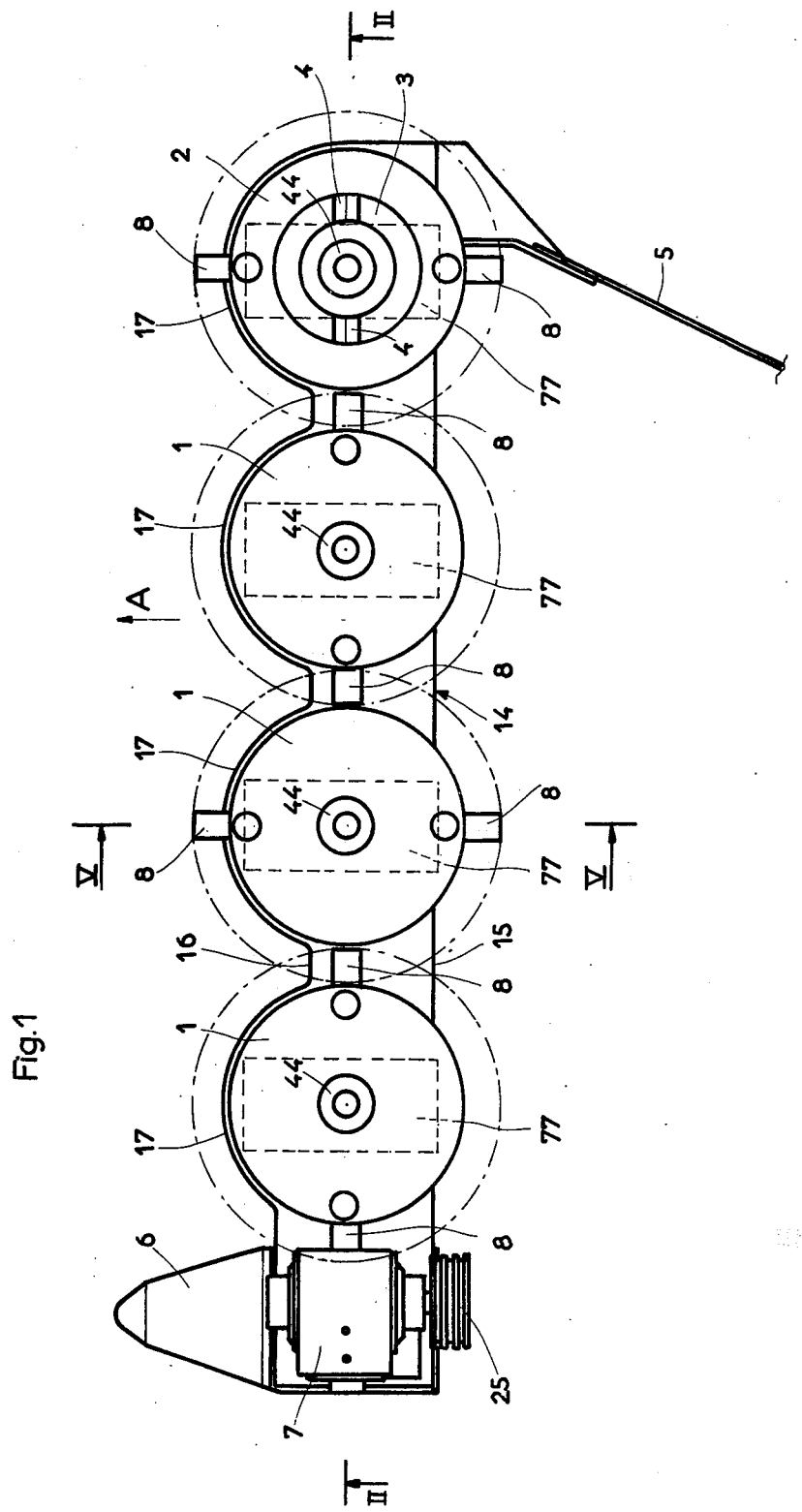
FIG. 1 represents a plan view of a mower according to the invention.

In the drawings, as represented in FIG. 1 the disc mower according to the invention comprises rotatable discs 1, 2 of circular form. These discs, which are similar to one another, can likewise be of oval form. A member 3 of frusto-conical form provided with ribs 4 is fitted over the disc 2 situated at the free extremity of the cutter bar. This free extremity is likewise provided with a swath plate 5. The other extremity of the cutter bar is equipped with a shoe 6 above which there extends a gear box 7 which will be described in greater detail below. This extremity is connected to a chassis (not shown) permitting the connecting of the disc mower to a tractor (not shown) necessary for driving and moving the disc mower in the direction of the arrow A. The discs 1 and 2 are respectively equipped with two diametrically opposite blades 8. Each blade 8 is mounted on the discs 1, 2 with the aid of a screw 9 and a nut 10 set into a dished protection washer 11. The screw 9 is shouldered so that each blade 8 is movable in rotation about the said screw 9 and can place itself in the radial position under the action of centrifugal force on rotation of the discs 1, 2.

These latter are in fact intended to be driven in rotation by means of a spindle 12 substantially perpendicular to the plane of FIG. 1, each disc 1, 2 being fixed on said spindle 12 by a nut 13. FIG. 1 likewise shows that the discs 1, 2 are disposed above a support plate 14 beneath which transmission members which will be described hereinafter at least partially extend.

It will be noted that the rear edge 15 of this support plate 14 is substantially rectilinear while the forward edge 16 is scalloped with portions 17 thereof concentric with each of the discs 1, 2, for the purpose of protecting the latter. These portions 17 are of a diameter slightly greater than that of the discs 1, 2 but noticeably less than the diameter of the rotary path of the blades 8. The blades 8 of two adjacent discs are situated in the same plane and their paths overlap in front of the forward edge 16 of the support plate 14. Therefore in order to avoid collision between the blades driven in rotation on neighboring paths, each disc is set off 90° in relation to the neighboring discs.

Figure 2:
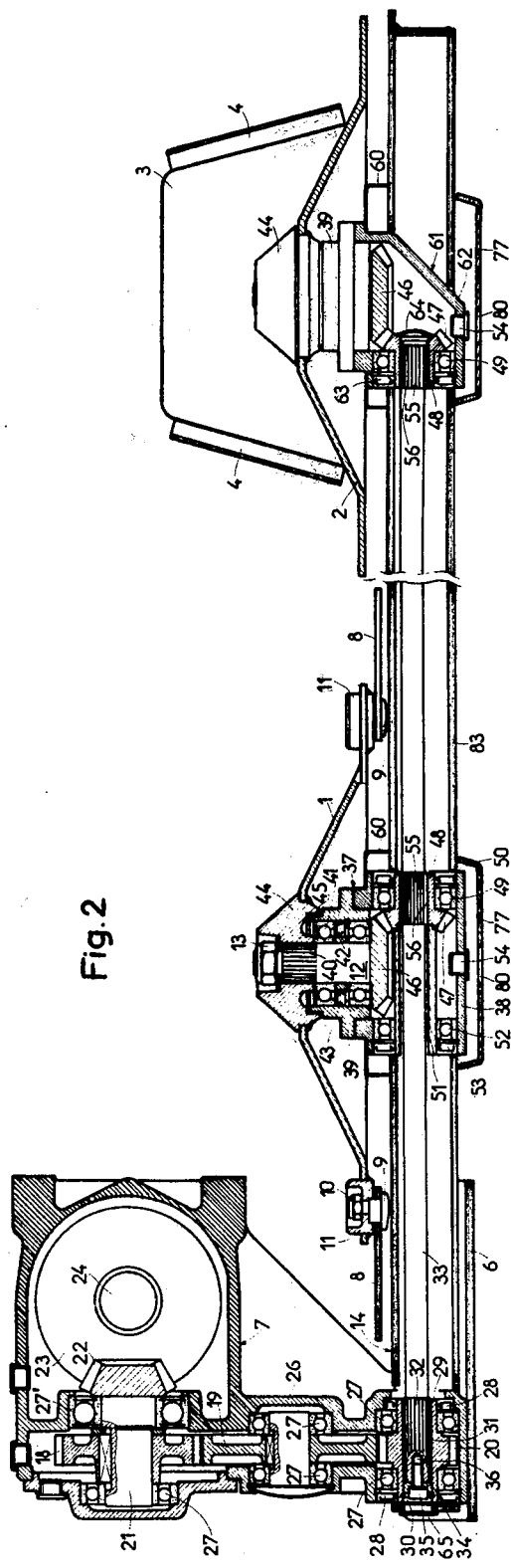
FIG. 2 represents a partial longitudinal section along the line II—II in FIG. 1.

Referring to FIG. 2, it can be seen that the gear box 7, fixed to the inner end of the cutter bar of the machine on the support plate 14, comprises a train of three pinions 18, 19, 20 in mesh with one another. The upper pinion 18 is keyed on the same shaft 21 as a bevel pinion 22 cooperating with a bevel wheel 23 keyed on a spindle 24 having pulley 25 fixed (FIG. 1) in which there fit V-belts serving for the drive of said mower. The intermediate pinion 19 fixed on spindle 26 meshes simultaneously with the pinion 18 and the pinion 20 which at least partially extends beneath the level of the support plate 14. All these pinions are guided in rotation by means of ball bearings 27', 27 which support the shafts 21, 26 and 33. As the gear box 7 contains a certain quantity of lubricant, sealing devices 28 are provided especially at its base, between its walls and the pinion 20, which for this purpose comprises a cylindrical part 29 extending on either side of its main toothed portion and concentrically therewith. This cylindrical part 29 serves as support means for the bearings 27 and for ring seals 28.

The cylindrical part 29 comprises a bore 30. This bore possesses internal splines 31 intended to cooperate with external splines 32 of a transmission member 33 in the form of a shaft extending substantially over the whole length of the support plate 14 of the mower. The internal splines 31 of the pinion 20 however do not extend over the whole length of its bore 30. The latter comprises at one of its extremities a smooth cylindrical part in which there is lodged a kind of washer 34. This washer, which can for example be made fast with the pinion 20 by adhesion or be immobilised translationally in its bore 30 by means of a circlip, is pierced with a hole extending into the axis of the bore 30. A screw 35, the head of which is lodged in a chamber of the washer 34, passes through the latter and is screwed into threaded means 36 provided at the end of the transmission shaft 33. Thus this shaft is fast with the pinion 20 and driven in rotation therewith when the machine is set in operation.

It will be noted from FIG. 2 that the gear box 7 is relatively narrow at its base since the pinions 18, 19 and 20 extend in a vertical plane parallel to the direction A of travel of the mower. Thus it is possible to design a mower the total width of the cutter bar of which is very close to its operative width.

The transmission shaft 33 extending substantially below the whole length of the support plate 14 likewise passes beneath a the discs 1, 2 distributed regularly along the said plate 14. In FIG. 2 only two discs are represented, but it is quite apparent that this number is not limitative.

The transmission shaft 33 passing beneath each disc 1 in each case traverses a disc housing 37. Each housing 37 has the form of a cylinder in its lower part 38, the axis of which cylinder practically coincides with the axis of the transmission shaft 33 passing through the said lower part 38. In its upper part 39 each disc housing 37 is likewise cylindrical. The axis of this upper part 39 is however vertically directed perpendicularly of the axis of the transmission shaft 33, interesting the latter. Each housing 37 contains a spindle 12 on which the disc 1, 2 is keyed by means of splines 40 and a nut 13. The spindle 12 is supported in the upper part 39 of each disc housing 37 by means of two bearings 41 between which a spacer sleeve 42 is lodged which cooperates with a ring seal 43. The central part 44 of each disc 1, 2 and the upper part 39 of each disc housing 37 are provided with staggered portions 45 intended to prevent the introduction of foreign bodies into the bearing of the shaft 12.

This shaft 12 is provided at its lower part with a bevel wheel 46 meshing with a bevel pinion 47 the axis of which is situated on the axis of the transmission shaft 33. Between one side of the bevel pinion 47 and one end of the disc housing extends a sleeve 48 serving as support bearing for a bearing 49 guiding said bevel pinion 27 in the lower part 38 of the housing 37. This sleeve 48 likewise serves as bearing surface for a ring seal 50 provided at one of the extremities of the lower part 38 of the disc housing 37. The other side of the pinion 47 is prolonged by a sleeve 51 coaxial with the pinion 47 and the transmission shaft 33. This sleeve 51 is fast with the pinion 47. The sleeve 51 extends to the other extremity of the lower part 38 of the disc housing 37 where it cooperates with a bearing 52 and a ring seal 53. The disc housing is thus perfectly sealed and can be filled with oil or grease, according to the invention, irrespective of the presence of the transmission shaft 33 the positioning of which in the housing 37 does not affect the sealing of the latter. An outlet stopper 54 can be provided at the base of each disc housing 37. The transmission shaft 33 traversing each disc housing 37 by passing through its sleeve 51 is provided with external splines 55 intended to cooperate with matching internal splines 56 provided in the bore of the pinion 47. The rotation of said shaft 33 driven by the pinion 20 of the gear box 7 drives the pinion 47 which, cooperating with the bevel wheel 46, rotates the disc, 1, 2 through the intermediary of the shaft 12.

The splines 56 can extend over the whole length of the assembly formed by the sleeve 51 and the pinion 47 and cooperate with the splines 55 extending over the same length on the transmission shaft 33. According to the invention the length of the splines 32 and 55 of the shaft 33 is however limited to a length approximately equal to that of the splines 31 and 56 of the pinions 20 and 47, that is to say the transmission shaft 33 is without splines outside the regions where it does not cooperate with the drive members. The advantage of this form of embodiment consists especially in the fact that it is possible to withdraw the transmission shaft 33 from the said drive members even if the said shaft 33 and consequently its splines are twisted.

The splines of the drive members and of the transmission shaft 33 are of low height since all the component elements of the mower situated beneath the discs 1, 2 must be of the least possible thickness so that the cutting height is as low as possible. In order that the said splines may nevertheless resist the torque which they have to transmit, their number is relatively large and is advantageously greater than or equal to nine. This large number of splines permits of reducing both the unit pressure which each male spline exerts in each female spline and the stress concentrations. Moreover the large number of splines permits the transmission shaft 33 to withstand the torsion since the profile of its section is relatively regular. Finally the large number of splines permits of reducing the risk of bursting of the sleeve 51 in the case where it is the latter which is provided with internal splines 56 with the purpose of driving the pinions 47 and consequently the discs 1, 2. The thickness of the wall of the sleeve 51 can likewise be very reduced, thus contributing to limitation of the height of the mower members situated beneath its discs 1, 2.

Referring to FIGS. 2 and 3 it is seen that the direction of rotation of the discs 1, 2 is a function solely of the position in which each disc housing 37 is fitted on its support plate 14. In fact if the pinion 47 is situated to the right of the shaft 12 on which the disc 1, 2 is mounted the latter will rotate in a certain direction while if this same pinion 47 is situated to the left of this shaft 12 the said disc 1, 2 will rotate in the other direction. To obtain the change of direction of rotation of any one of the discs 1, 2 it is sufficient simply to dismantle its housing 37, after having withdrawn the transmission shaft 33 therefrom, to rotate it through 180° about the axis of its shaft 12 and re-fit it on the support plate 14. Each disc housing 37 surmounted by its disc 1 thus has an axis of symmetry coinciding with the spindle 12 on which the discs 1, 2 are respectively mounted. To facilitate the fitting and removal of these disc housings 37 on the support plate 14 the latter is provided with fixing devices such as threads 57 (FIG. 5) the axis of which is perpendicular to the said plate 14. The housings 37, which are all identical with a view to standardisation, are fixed on the said plate 14 with the aid of screws 58 which can be placed in position solely by to screwing into the said support plate 14. The disc housings 37 are thus mounted on the support plate 14 with the fixing elements 58 extending exclusively perpendicularly to the said support plate and by simple displacement perpendicular to the plane in which the said plate 14 extends. The said housings are fixed there with screws 58 the heads of which bear on lugs 59 of the disc housings 37. A supplementary cover 60 permits complete closure of the aperture by which each housing 37 extends over the support plate 14.

It has been seen above that each disc housing 37 comprises two ring seals 50 and 53 respectively disposed at the two extremities of its lower cylindrical part 38. The presence of these two ring seals is explained by the fact that the transmission shaft 33 passes from end to end through the housings 37. This is not the case with the casing 61 of the end disc housing which is blind (FIG. 2). Therefore the lower part 62 of the disc housing casing 61 comprises only a single ring seal 63 disposed between the socket 48 of the bevel pinion 47 and one of the extremities of the lower part 62 of the disc housing 61. So that the latter may be sealed independently of the presence of the transmission shaft 33, the splined bore of the pinion 47 is either blind or provided with a stopper 64 permanently fixed on the said pinion 47. Thus it is possible to withdraw the shaft 33 without risk of the lubricant escaping from the disc housing 61. As may be seen from FIG. 3 the end disc 2 can likewise be mounted on a housing 37 identical with those on which the discs 1 are mounted, without the lubricant escaping from this end housing in the case of dismantlement of the shaft 33.

The said dismantlement of the shaft 33 is moreover very simple. For this purpose it is sufficient to remove the stopper 65 which protects the cutter bar from the introduction of dirt, remove the screw 35 and its washer 34, then withdraw the shaft 33 longitudinally from the extremity of the cutter bar on the side on which the gear box 7 is situated. In order that the shaft 33 may be extracted easily, it is sufficient to screw one end of a threaded rod of suitable length into the 36 of the shaft 33, then to pull upon the said rod. This operation is effected without any loss of lubricant since all the disc housings 37, 61 and the gear box 7 are provided with a sleeve 51 each or the like through which the said shaft 33 extends, with isolation from the lubricant contained in the gear box 7 or the housings 37.

According to a variant of embodiment it is likewise possible to withdraw the transmission shaft from the mower according to the invention on the side of the cutter bar where the swath plate 5 is situated. This is the case in particular when the washer 35 is is secured in the bore 30 of the pinion 20 and the end disc housing 61 is identical with the other disc housings 37, as represented in FIG. 3.

In order to effect such dismantlement it is sufficient to remove the stopper 65 and the screw 35 and then, after having removed the stopper 66 (FIG. 3) which carries out the same functions as the stopper 65 and is opposite thereto, to extract the transmission shaft longitudinally by pulling upon a threaded rod of suitable length screwed solely for the purpose of the extraction of the said shaft into threaded means 67 similar to that of the screw 35 but opposite thereto, this threaded means 67 extending along the axis of the transmission shaft and at its extremity situated approximately beneath the disc 2 of the mower.

Another form of embodiment of the invention is represented in FIGS. 3 and 4. The references in FIGS. 1 and 2 are repeated in FIGS. 3 and 4 for the designation of the identical elements.

In FIG. 3 the transmission shaft is no longer made in one single piece but is composed of a plurality of similar sections 68 assembled to one another. The length of these sections is approximately equal to the distance separating the rotation axes of two adjacent discs 1, 2. The two extremities of each section 68 are provided with splines 69 of characteristics identical with those with which the shaft 33 is equipped as represented in FIG. 2. The section 68 situated beneath the disc 2 extends to the extremity of the cutter bar of the mower. This extremity is provided with the threaded means 67 serving for the extraction of the assembly of sections 68 by means of a threaded rod screwed into the said threading, as explained above.

So that the rotating movement of one of the sections 68 can be transmitted to another section 68, the extremities of two adjacent sections 68 are both engaged in the same splined bores of the pinions 47 or of the sleeves 51. Thus the torque transmitted by the first section 68 cooperating with the pinion 20 of the gear box 7 is transmitted to the pinion 47 which transmits this torque through the intermediary of its splines 56 to the extremity of another adjacent section 68, and so forth so that each pinion 47 is driven in rotation in the same manner as the shaft 33 drives the said pinions 47, if the example of embodiment according to FIG. 2 is considered.

This form of embodiment possesses the advantage that it is much easier to machine the sections 68 of the transmission shaft with shorter length rather than a single transmission shaft 33 which must be of small diameter and have a great length.

Nevertheless this system of drive by shaft sections 68 poses assembly problems since several of these sections 68 must be introduced one after the other in the course of their fitting, from the first disc housing 37 into the second, then into the third etc., as a function of the number of disc housings 37 which must be interconnected for the drive of their respective discs. As these sections 68 are equipped with splines 69 only at their extremities they are not constantly guided in their passage from one disc housing into the other.

This guidance problem has been solved by interconnecting the sections 68 by their extremities by means of threaded rods 70 screwed into threaded means 71 extending axially of the said sections 68 which can thus be assembled end to end, as can be seen in detail in FIG. 4. The adjacent sections 68 are however essentially connected in translation. In fact the extremities of two adjacent sections 68 are not in contact, so that the position of their respective splines 69 can be adjusted in such manner that these are situated one opposite to the other. So that the said adjacent lengths 68 remain in position in relation to one another after the adjustment of the position of their splines 69 has been effected, an elastic device 72 has been interposed between the said lengths 68. This elastic device is constituted for example by one or more elastic washers of the Belleville type. A spring mounted on the threaded rod 70 and bearing upon the end flanks 73 and 74 of two adjacent sections 68 fulfils the same braking function intended to prevent the rotation of one of the sections 68 in relation to the other in the fitting of these sections when they are assembled with one another. In this way the splines 69 of the various sections 68 remain in position in relation to one another. This assembly arrangement of the sections 68 to a certain extent permits of re-constituting the transmission shaft 33 as described in the variant of embodiment of the invention illustrated in FIG. 2.

In FIG. 3 there is also represented another form of embodiment of the sleeve-pinion assembly. In fact in FIG. 3 a sleeve 75 extends between the two extremities of the lower part 38 of each housing 37. This sleeve 75 comprises at each of its extremities two bearing surfaces intended respectively for a ring seal 53 and a bearing 52. A pinion 76, the toothed portion of which has the same characteristics as the pinion 47, is mounted coaxially on the sleeve 75; thus the pinion 76 can be welded on the sleeve 75, can be made in one single piece therewith or rendered fast therewith by means of splines, the translation arresting of this pinion 76 in relation to the sleeve 75 being effected for example by means of circlips or struts.

The assembly of sleeve 75 and pinion 76 is equipped with internal splines 56 cooperating with the external splines 69 provided on the ends of the transmission members 68.

The replacement of the assembly of sleeve 51 and pinion 47 by the sleeve 75 on which the pinion 76 is mounted changes nothing in the operation of the machine. The drive of the discs 1 and 2 remains the same as that represented in FIG. 2. Thus for further details reference will be made in particular to the description of FIG. 2.

Figure 5:
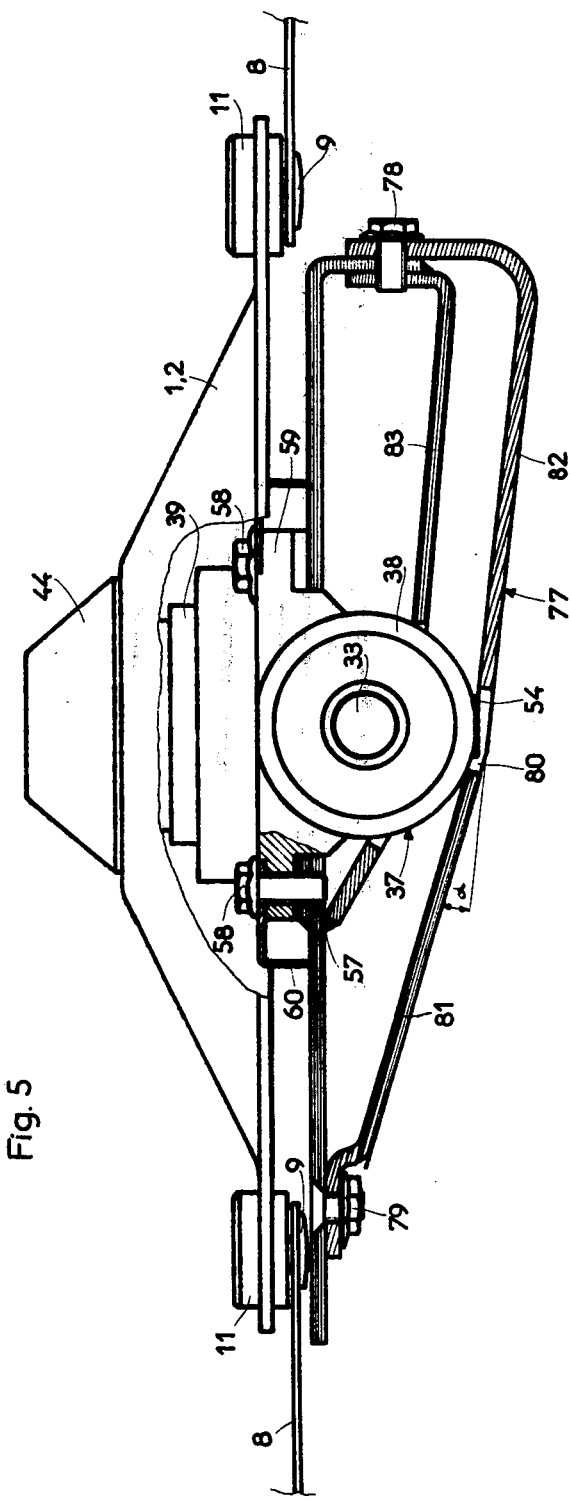
FIG. 5 represents a cross-sectional view along the line V—V in FIG. 1.

In FIG. 5, which represents a section in a plane parallel to the direction A of advance of the machine, it is seen that each disc housing 37, 61 fixed on the support plate 14 is protected by a sole-piece 77 extending beneath the said housings from the rear extremity to the front extremity of the support plate 14. This sole-piece 77 is fixed to the support plate 14 by means of screws 78 and 79 and comprises a passage hole 80 for the discharge stopper 54 for the disc housings 37, 61. Forward of these housings 37, 61 the forward part 81 of the sole-piece 77 re-joins the support plate 14, forming an angle α of small value with the rear part 82 thereof. This permits of varying the degree of inclination of the mower in order to move the blades 8 nearer to or farther from the ground and obtain a more or less close cutting of the fodder.

A supplementary metal sheet 83 welded to the support plate 14 extends in one piece between the said support plate 14 and the sole-pieces 77 of the disc housings 37, 61. This metal sheet 83, through which the said housings 37, 61 pass, is intended especially to protect the transmission members 33, 68 so that fodder debris are not accumulated at the level of the said transmission members.

Moreover it is seen from FIG. 5 that the device for fixing the blades 8 on the discs 1, 2 is situated beyond the rear edge 15 of the lower casing, constituted by its support plate 14, its metal sheet 83 and its sole-pieces 77. This permits easy fitting of the screws 9 on which the blades 8 are mounted. These screws 9 can in fact be introduced into the discs 1, 2 from beneath, without need for dismantlement of the discs.

The assembly of the mower according to the invention is very simple, and takes place in the following manner. Once the gear box 7 is pre-assembled, it is mounted on the support plate 14 to which the metal sheet 83 is welded. FIG. 5 shows clearly that the said plate 14 and the sheet 83 are very simple parts requiring no great precision in machining and consequently easily produced by bending.

Then the pre-assembled disc housings 37, 61 are fitted in any order whatever, care being taken however to ensure their orientation by simply screwing them on the support plate 14. The following operation consists in setting the transmission members 33, 68 in position, then the discs 1, 2 and finally the sole-pieces 77, the shoe 6 and the swath plate 5.

The assembling of the cutter bar is then practically completed and can be effected by non-specialist labour without special equipment and without the need to match the parts prior to their assembly, which is almost inevitably the case when for example struts connect the disc housings with one another. Another advantage of the invention consists in the fact that the use of sealed disc housings each containing its own lubricant permits of eliminating the delicate and costly sealing devices existing on mowers possessing oil bath housings.

The simplicity of the assembly of the mower according to the invention is also found in the maintenance of this machine in as much as the final user, that is the farmer, is perfectly capable in view of his normal mechanical knowledge of changing the disc housings 37, 61 in the case of deterioration of one of them. On the occasion of this repair there is no need for special precautions for preserving the lubricant contained in the mower or for re-filling with lubricant, since this is contained in sealed manner within each disc housing.

The user of the mower according to the invention can even transform the machine, without further difficulty, by selecting the direction of rotation of the discs by fitting the disc housings 37, 61 in one manner or the other, which contributes to flexibility of use of said machine.

Thus the mower according to the invention possesses a supplementary advantage over machines in which the discs interpenetrate one another in rotation. To this end they comprise notches the position of which is a function of their direction of rotation. It is thus impossible to change the direction of rotation of these discs by simple reversal of a disc housing for example. It is quite apparent that the present invention is in no way limited to the examples of embodiment as described above and that various improvements, modifications or additions can be effected in it without thereby modifying its general economy. In particular it will be possible to replace the transmission shaft 33 as represented in FIG. 2 by the assembly of splined sections 68 as represented in FIG. 3. It will also be possible to utilise the sleeve 75 and its pinion 76 in the example of embodiment as illustrated in FIG. 2 or to ulilise a blind disc housing 61 in combination with a transmission shaft made in a plurality of lengths 68, these various combinations not departing from the scope of the present invention.

What is claimed is:

1. A mower comprising a plurality of dics having cutting elements thereon, transmission shaft means extending beneath said discs for driving said discs in rotation about upright axes, a housing for each said disc, gears in said housings for driving said discs in rotation upon rotation of said transmission shaft means, said housing and gears being sealed independently of said shaft means, a support plate for supporting said housings, and means releasably connecting said housings with said support plate for attachment and removal of said housings to and from said support plate by movement perpendicular to the plane of said plate, said releasable connecting means extending exclusively perpendicular to the support plate.

2. A mower as claimed in claim 1, in which said connecting means are all accessible from only one of the faces of said plate.

3. A mower as claimed in claim 1, in which most of said housings are identical and bisymmetric about a plane that includes the axis of rotation of their corresponding disc and that is perpendicular to said shaft means.

4. A mower as claimed in claim 2, each said housing including a sleeve, a bevel gear on said sleeve, means drivingly interconnecting the transmission shaft means and the sleeve, and sealing means sealing between one end of the housing and one end of the sleeve, measured in a direction parallel to the shaft means, and sealing means sealing between the other end of the housing and the bevel gear.

5. A mower as claimed in claim 4, said means interconnecting the sleeve and the shaft means comprising at least nine splines interengaging between the sleeve and shaft means.

6. A mower as claimed in claim 4, said shaft means being continuous substantially full length of the plate and being interconnected with said sleeves by spaced sets of splines.

7. A mower as claimed in claim 4, said shaft means comprising a plurality of sections of a length about equal to the interval between discs, and threaded rods interconnecting said sections at their adjacent ends.

* * * * *